United States Patent
Teng et al.

(10) Patent No.: US 7,380,946 B1
(45) Date of Patent: Jun. 3, 2008

(54) SEMIAUTOMATIC KEYSTONE CORRECTION SYSTEM AND METHOD

(75) Inventors: Tianbing Brian Teng, Portland, OR (US); Mike Callahan, Tualatin, OR (US)

(73) Assignee: Pixelworks, Inc., Tualatin, OR (US)

( * ) Notice: Subject to any disclaimer, the term of this patent is extended or adjusted under 35 U.S.C. 154(b) by 0 days.

(21) Appl. No.: 10/723,002

(22) Filed: Nov. 26, 2003

Related U.S. Application Data (60) Provisional application No. 60/443,422, filed on Jan. 28, 2003.

(51) Int. Cl.
*G03B 21/00* (2006.01)
*G03B 21/14* (2006.01)
*G09G 5/10* (2006.01)
*H04N 3/23* (2006.01)

(52) U.S. Cl. .............. 353/69; 353/70; 353/121; 345/611; 348/746

(58) Field of Classification Search ......... 353/69–70, 353/121; 345/611; 348/746
See application file for complete search history.

(56) References Cited

U.S. PATENT DOCUMENTS

| | | | |
|---|---|---|---|
| 5,355,188 A * | 10/1994 | Biles et al. ............. 353/69 |
| 5,720,539 A | 2/1998 | Woo |
| 6,056,408 A * | 5/2000 | Kobayashi ............ 353/122 |
| 6,169,535 B1 | 1/2001 | Lee |
| 6,289,735 B1 | 9/2001 | Dister et al. |
| 6,305,805 B1 | 10/2001 | Leibenow |
| 6,310,662 B1 * | 10/2001 | Sunakawa et al. ....... 348/747 |
| 6,339,434 B1 * | 1/2002 | West et al. ............ 345/667 |
| 6,367,933 B1 * | 4/2002 | Chen et al. ............. 353/69 |
| 6,520,547 B2 | 2/2003 | Robinson |
| 6,520,646 B2 * | 2/2003 | Rodriguez et al. ....... 353/69 |
| 6,520,647 B2 * | 2/2003 | Raskar ................. 353/70 |
| 6,592,228 B1 * | 7/2003 | Kawashima et al. ..... 353/101 |
| 6,611,260 B1 | 8/2003 | Greenberg et al. |
| 6,686,973 B2 | 2/2004 | Su |
| 6,793,347 B2 | 9/2004 | Morishita |
| 6,836,298 B2 * | 12/2004 | Song et al. ............ 348/745 |
| 6,843,569 B2 * | 1/2005 | Hirao et al. ............ 353/70 |
| 6,846,081 B2 | 1/2005 | Mochizuki et al. |
| 6,867,753 B2 | 3/2005 | Chinthammit et al. |
| 6,962,417 B1 | 11/2005 | Teng et al. |
| 6,963,348 B2 * | 11/2005 | Diamond et al. ........ 345/647 |
| 6,974,217 B2 | 12/2005 | Kimura |
| 2001/0000300 A1 | 4/2001 | Haile-mariam |
| 2002/0008697 A1 * | 1/2002 | Deering ............... 345/418 |
| 2002/0063726 A1 | 5/2002 | Zhang et al. |
| 2002/0089651 A1 * | 7/2002 | Ejiri et al. ............. 353/69 |
| 2002/0109668 A1 | 8/2002 | Rosenberg et al. |
| 2003/0234797 A1 | 12/2003 | Williams et al. |
| 2004/0036844 A1 | 2/2004 | Wood et al. |

* cited by examiner

*Primary Examiner*—Diane I. Lee
*Assistant Examiner*—Magda Cruz
(74) *Attorney, Agent, or Firm*—Marger Johnson & McCollom, P.C.

(57) ABSTRACT

The invention relates to a semiautomatic keystone correction system and method. The system includes an interface and a controller. A user selects a plurality of corners within an image projected on a projection surface using the interface and the controller predistorts the image responsive to the selected plurality of corners where the predistorted image exhibits no distortion when re projected on the projection surface. The user further aligns a center of the image with a center of the projection surface, also using the interface. The controller predistorts the image by scaling the image in vertical and horizontal directions using vertical and horizontal scalars, respectively.

37 Claims, 9 Drawing Sheets

Figure 1

PRIOR ART

SEMIAUTOMATIC KEYSTONE CORRECTION SYSTEM AND METHOD

This application claims priority from U.S. provisional patent application Ser. No. 60/443,422 filed Jan. 28, 2003, titled Method and Apparatus for Keystone Correction, which we incorporate in its entirety.

FIELD OF THE INVENTION

This invention relates to a system and method capable of projecting images and, more particularly, to a system and method capable of semiautomatically correcting keystone distortion of projected images.

BACKGROUND OF THE INVENTION

Figure 1:
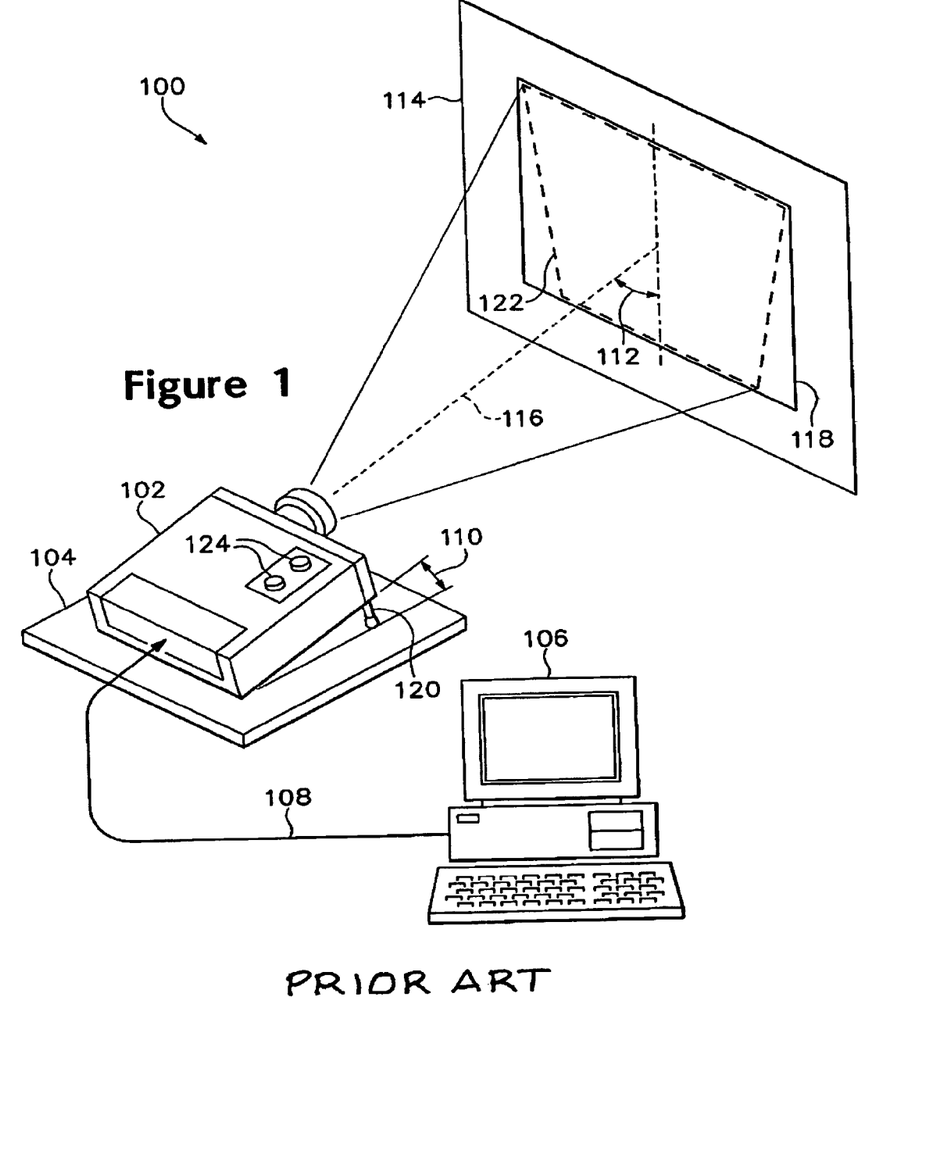
FIG. 1 is a diagram of a projection system.

Projection systems are widely used in training, sales, and business environments. Referring to FIG. 1, a projection system 100 includes a projector 102 positioned on a horizontal surface 104. The surface 104 is typically a desk or tabletop. An elevator 120 protrudes from the bottom sides of the projector 102 creating an angle 110 between the surface 104 and the projector 102. Only one elevator 120 is visible in FIG. 1 although a person of reasonable skill in the art should understand that a plurality of elevators 120 might be employed in the system 100. The angle 110 varies depending on the position of the elevator 120. The elevator 120 tilts the projector 102's position relative to the surface 104 such that projected image 118 moves up or down on a projection surface 114, increasing or decreasing the angle 110. The projection surface 114 might be a wall, screen, or any other surface capable of displaying a projected image 118.

The projector 102 manipulates image signals 108 it receives from a personal computer 106. A person of reasonable skill in the art should recognize that the projector 102 might receive different types of image signals, e.g., digital or analog signals, from the personal computer 106. The image signals 108 represent still, partial, or full motion images of the type rendered by the personal computer 106.

The projector 102 casts the image signals 108 onto the projection surface 114. The resulting projected image 118 centers about a projection axis 116. An angle 112 exists between the projection axis 116 and the projection surface 114. The angle 112 changes responsive to changes in the angle 110.

The projected image 118 is substantially undistorted if the projection axis 116 is perpendicular to the projection surface 114. That is, the image 118 is undistorted if the angle 112 is 90 degrees. The projected image 118, however, distorts if the projection axis 116 is not perpendicular to the projection surface 114. This distortion is termed keystone distortion (or keystoning) because the image will appear wider at the top than at the bottom as shown in the jagged lined image 122.

There are well known ways of correcting keystone distortion. The elevator 120 might, for example, be coupled to optics encased in the projector 102 that compensate for keystone distortion. The optics, however, are costly and prone to dust collecting that results in obscured projected images.

Signal processing circuits are often used, for example, to oppositely distort the image to thereby compensate for keystone distortion prior to projecting the image. But these circuits require floating point processes that exceed real time system capability.

The projector 102 might include gauges 124 used to manually adjust the projected image 118 to eliminate or minimize keystone distortion. The manual adjustments tend to move the projected image 118 out of the projection surface 114. And the manual adjustments, unfortunately, are time consuming, cumbersome, and generally an unwelcome set up complication.

Accordingly, a need remains for a semiautomatic keystone correction system and method.

BRIEF DESCRIPTION OF THE DRAWINGS

The foregoing and other objects, features, and advantages of the invention(s) will become more readily apparent from the detailed description of invention embodiments that references the following drawings.

DESCRIPTION OF THE INVENTION

Figure 2:
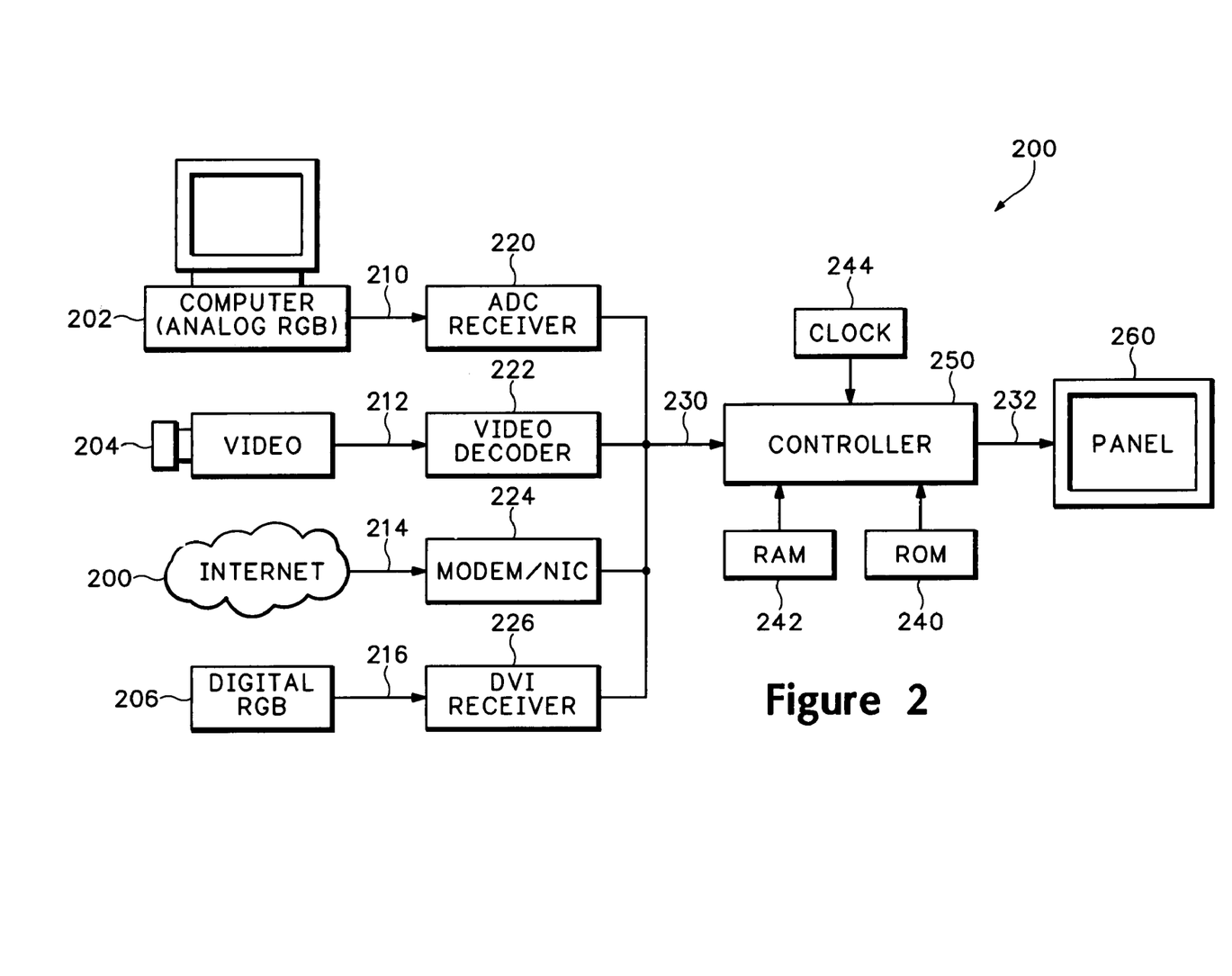
FIG. 2 is a block diagram of an embodiment of a projection system.

FIG. 2 is a block diagram of a projection system 200 according to an embodiment of the present invention. Referring to FIGS. 1 and 2, the system 200 is capable of projecting an image 118 on a projection surface 114. The system includes a receiver 220 for receiving an analog image data signal 210, e.g., an RGB signal, from a source 202. The receiver 220 might be an analog-to-digital converter (ADC) or the like. The source 202 might be a personal computer or the like. The receiver 220 converts the analog image data signal 210 into digital image data 230 and provides it to the panel controller 250.

Likewise, a video receiver or decoder 222 decodes an analog video signal 212 from a video source 204. The video source 204 might be a video camcorder and the like. The decoder 222 converts the analog video signal 212 into digital image data 230 and provides it to the panel controller 250.

A modem or network interface card (NIC) 224 receives digital data 214 from a global computer network 206 such as the Internet®. The modem 224 provides digital image data 230 to the panel controller 250.

A Digital Visual Interface (DVI) receiver 226 receives digital RGB signals 216 from a digital RGB source 208. The DVI receiver 226 provides digital image data 230 to the panel controller 250.

A person of reasonable skill in the art should recognize other sources and other converters come within the scope of the present invention.

The panel controller 250 generates panel data 232 by manipulating the digital image data 230. The panel controller 250 provides the panel data 232 to a flat panel device 260. The panel 260 is any device capable of projecting the digital image data 230. In an embodiment, the panel 260 includes a pixelated display that has a fixed pixel structure together with the optics and electronics necessary to project the digital image data 232 on a surface 114 (FIG. 1). Examples of pixelated displays are active and passive LCD displays, plasma displays (PDP), field emissive displays (FED), electro-luminescent (EL) displays, micro-mirror technology displays, low temperature polysilicon (LTPS) displays, and the like for use in television, monitor, projector, hand held, and other like applications. The optics and electronics necessary to project the panel data 232 are well known to those of reasonable skill in the art.

In an embodiment, the panel controller 250 might scale the digital image data 230 for proper projection by the panel 260 using a variety of techniques including pixel replication, spatial and temporal interpolation, digital signal filtering and processing, and the like. In another embodiment, the controller 250 might additionally change the resolution of the digital image data 230, changing the frame rate and/or pixel rate encoded in the digital image data 230. Scaling, resolution, frame, and/or pixel rate conversion, and/or color manipulation are not central to this invention and are not discussed in further detail. A person of reasonable skill in the art should recognize that the controller 250 manipulates the digital image data 230 and provides panel data 232 to a panel 260 that is capable of properly projecting a high quality image regardless of display type.

Read-only (ROM) and random access (RAM) memories 240 and 242, respectively, are coupled to the display system controller 250 and store bitmaps, FIR filter coefficients, and the like. A person of reasonable skill in the art should recognize that the ROM and RAM memories 240 and 242, respectively, might be of any type or size depending on the application, cost, and other system constraints. A person of reasonable skill in the art should recognize that the ROM and RAM memories 240 and 242 might not be included in the system 200. A person of reasonable skill in the art should recognize that the ROM and RAM memories 240 and 242 might be external or internal to the controller 250. Clock 244 controls timing associated with various operations of the controller 250. A person of reasonable skill in the art should recognize that the projector 102 might house all or part of the controller 250, clock 244, RAM 242, ROM 240, panel 260, as well as the optics and electronics necessary to project the panel data 232.

Figure 3:
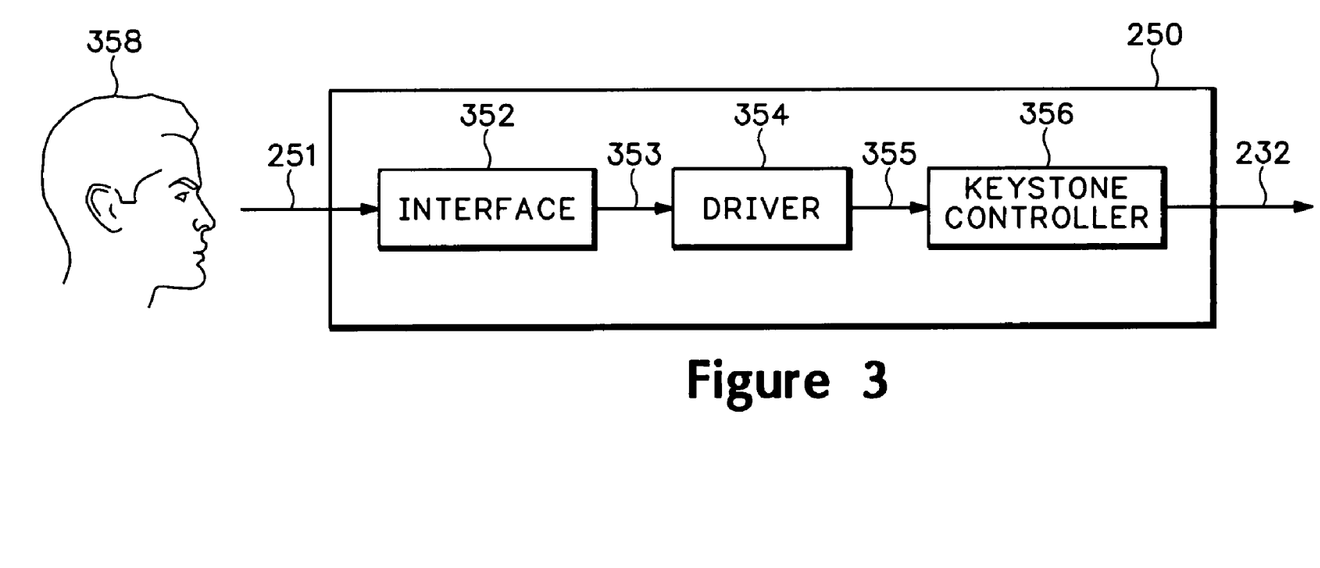
FIG. 3 is a block diagram of an embodiment of a controller.

FIG. 3 is a block diagram of an embodiment of the controller 250 shown in FIG. 2. Referring to FIGS. 1-3, the controller 250 includes an interface 352 coupled to a driver 354 and a keystone controller 356. The interface 352 interacts with a user 358 in a variety of manners. The interface 352 shows the user 358 instructions on e.g., on the projection surface 114, and accepts input 251 from the user 358 using a variety of input means, including infrared input devices, keypads, and/or mice (not shown). The interface 352 might be a graphical user interface (GUI) that takes advantage of the controller 250's graphics capabilities to ease the interaction between it and the user 358. The interface 352 might support such features as infrared input devices, keypads, mice, pointers, other pointing devices (e.g., trackball), graphically presented commands (e.g., icons), desktops, windows, and/or menus.

The user 358 indicates to the interface 352 properties of the projected image 118 and/or the projection surface 114. In an embodiment, the interface 352 generates an electronic icon or other GUI that the user 358 manipulates to align a center of the projected image 118 with a center of the projection surface 114. The user 358 actuates the GUI to inform the interface 352 of the centers' alignment (and its position). It should be apparent to a person of skill in the art that the user 358 can align the center of the projected image 118 with surfaces or areas other than the projection surface 114.

The user 358 uses the interface 352's GUI (e.g., on screen display) to select a plurality of corners of the desired (undistorted) image within the projected image 118. The plurality of corners might be, e.g., two, three, or four corners. In an embodiment, the user's selected corners lie within the projected image 118.

The interface 352 transmits the user's input 353, e.g., the center and plurality of corners, to the driver 354. The driver 354, in turn, interprets the user's input 353 to calculate the horizontal and vertical rotation angles $\beta_h$ and $\beta_v$.

The keystone controller 356 uses the information provided by the driver 354, e.g., the rotation angle, to (pre) distort the image 118 before its (re) projection by the projector 102 on the surface 114. By doing so, the controller 250 (pre) distorts the image prior to and to account for keystone distortion visible on the projected image 118. The (pre) distorted image will exhibit little to no keystone distortion once projected on the surface 114.

FIGS. 5A-D are graphic representations of the operation of the system 200 from the user's perspective. Referring to FIGS. 1-3, and 5A-5D, the projected image 518 is projected on a surface 514. The projected image 518 has a center 562. The projection surface 514 has a center 564. The user aligns the center 562 with the center 564 (FIG. 5B) using the interface 352.

Figures 5A, 5B:
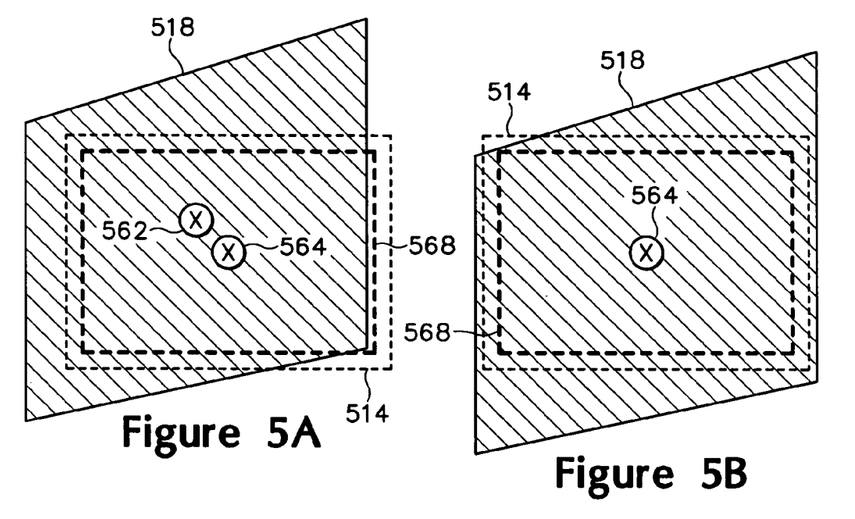
FIGS. 5A-D are graphic representations of the operation of the system 200 from the user's perspective.
Figure 5C:
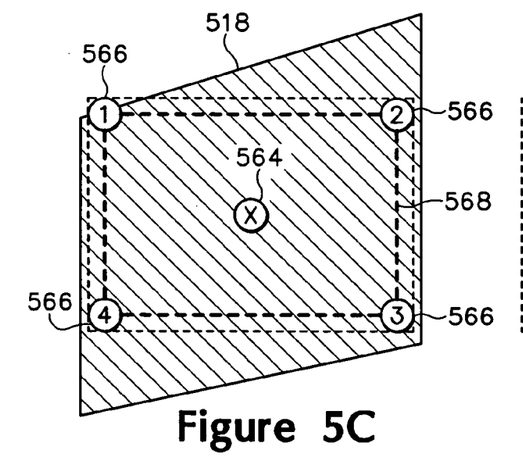
Figure 5D:
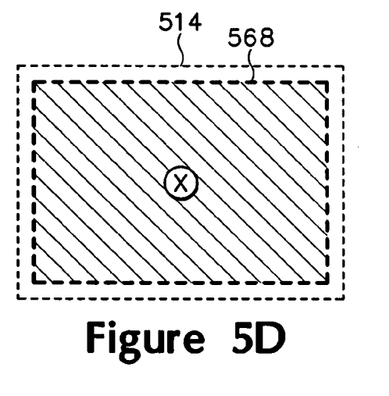

The user selects a plurality of corners 566 indicating where it wants the corners of the undistorted (re) projected image 568. The plurality of corners 566 might lay within the projected image 518 and the screen 514. The controller 250 scales or (pre) distorts the original image such that the newly projected image 568 does not exhibit keystone distortion. The projected image 568 has a center aligned with the center 564 and corners coincident with corners 566 selected by the user.

Figure 4:
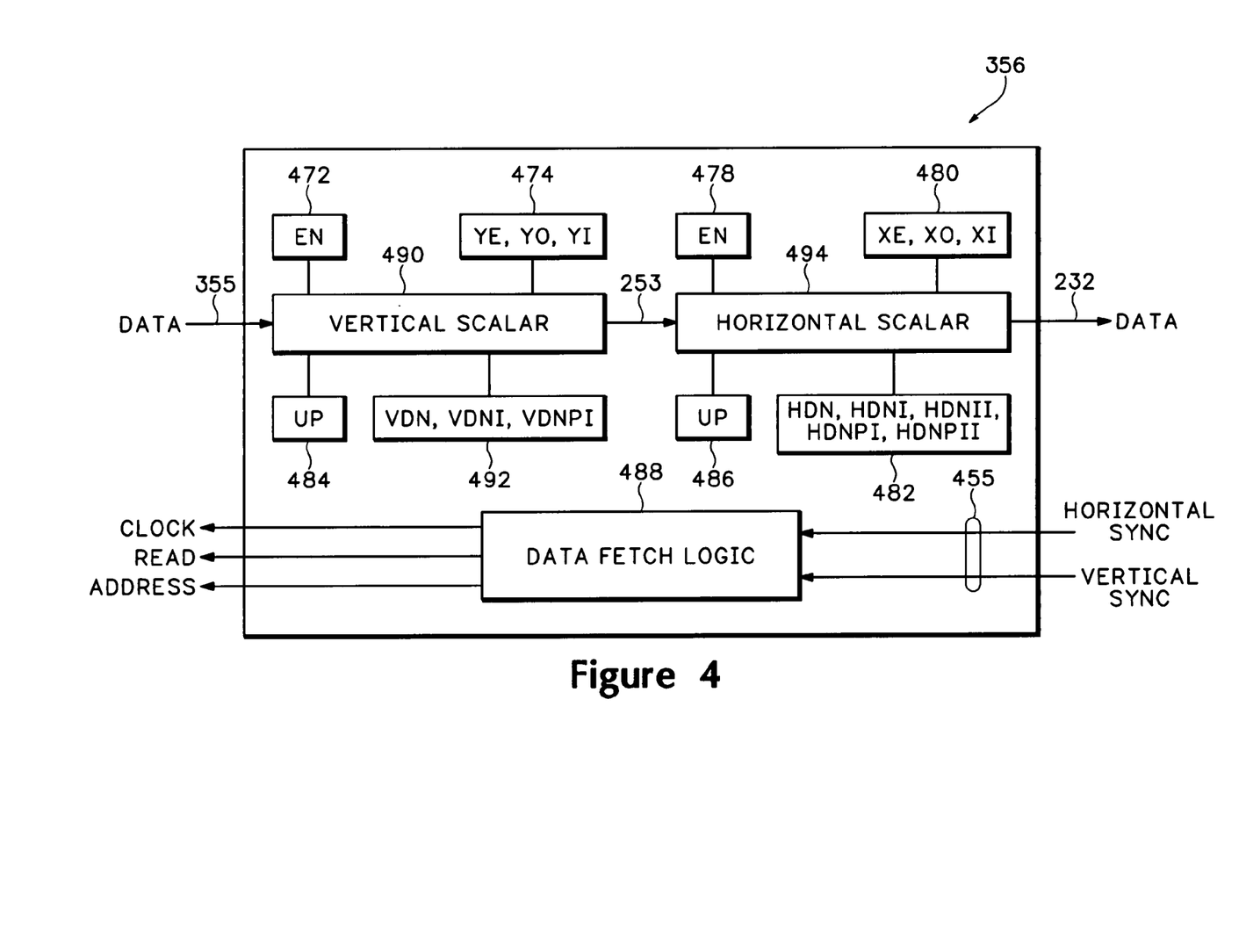
FIG. 4 is a block diagram of an embodiment of a keystone controller.

FIG. 4 is a block diagram of the keystone controller 356. Referring to FIGS. 1-4, a keystone controller 356 receives digital image data 355 from the driver 354. Digital image data 355 includes digital image data 251 provided by e.g., the computer 357. Digital image data 355 includes the user's input as provided to the interface 352, e.g., requesting keystone correction and identifying a center and corners as we discussed above.

If the angle 112 is 90 degrees, the projector 102 will project the digital image 355 as an undistorted image 118. That is, if the projection axis 116 is perpendicular to the surface 114, the projector 102 will project the digital image 355 as an undistorted image 118. If the angle 112 is not 90 degrees (that is, if the projection axis 116 is not perpendicular to the surface 114), the digital image 355 will project a distorted image 122. The controller 250 and, more particularly, the keystone controller 356, (pre) distorts the digital image data 355 prior to its (re) projection such that when the projector 102 (re) projects the (pre) distorted image data 232 on the surface 114, the image appears as if the angle 112 where 90 degrees. Put differently, the keystone controller 356 outputs digital image data 232 that is a distorted version of the digital image data 355. The keystone controller 356 maps (scales or distorts) the original image 518 to the desired image 568. The keystone controller 356 effectuates the distortion by vertically and horizontally scaling the digital image data 355 responsive to the user's input, e.g., the user's center and corner selections.

The keystone controller 356 includes a vertical scalar 490 for vertically scaling the digital image data 355. And the keystone controller 356 includes a horizontal scalar 494 for horizontally scaling the image data 253.

A vertical enable register 472 enables the vertical scalar 490. The vertical scalar 490 generates the vertically scaled data 253 responsive to vertical offset registers 474 including the registers YE (column even), YO (column odd), and YI (column increment ($1^{st}$ order term)) where the image data 355 is an interlaced signal. And the vertical scalar 490 generates the vertically scaled data 253 responsive to the vertical registers 492 including registers VDN (line position), VDNI (increment per line ($1^{st}$ order term)), and VDNPI (increment per column). The vertical scalar 490 moves up one row or line responsive to the UP register 484. The microprocessor 488 scales the image date 355 responsive to the registers 472, 474, 484, and 492 and to the horizontal and vertical synchronization signals 455.

Likewise, a horizontal enable register 478 enables the horizontal scalar 494. The horizontal scalar 494 generates the horizontally and vertically scaled data 232 responsive to horizontal offset registers 480 including the registers XE (row even), XO (row odd), and XI (row increment ($1^{st}$ order term)) where the image data 355 is an interlaced signal. And the horizontal scalar 494 generates the horizontally and vertically scaled data 232 responsive to the horizontal registers 482 including registers HDN (row position), HDNI (increment per line ($1^{st}$ order term)), HDNII (increment per line ($2^{nd}$ order term)), and HDNPI (increment per column). The horizontal scalar moves one column or pixel responsive to the UP register 486. The microprocessor 488 scales the image data 355 responsive to the registers 478, 480, 482, and 486 and to the horizontal and vertical synchronization signals 455.

Figure 6A:
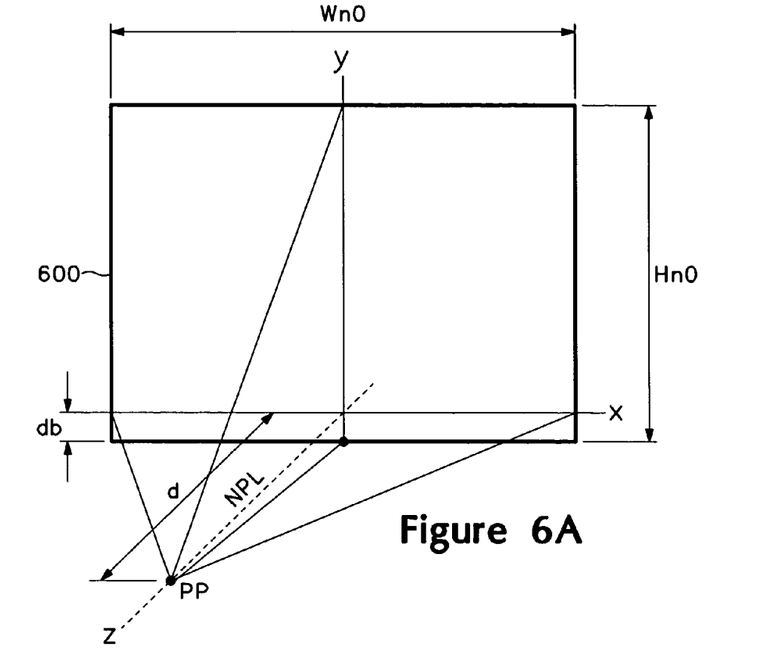
FIGS. 6A-C are diagrams of a coordinate system used to describe keystone distortion.
Figures 6B, 6C:
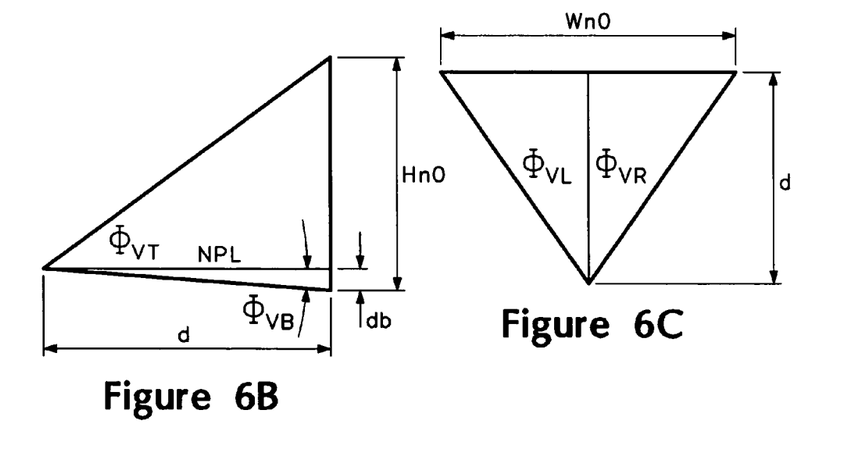

Before turning to the operation of the keystone controller 356, we examine some keystone basics. FIGS. 6A-C are diagrams of a coordinate system used to describe keystone distortion. Referring to FIGS. 6A-C, a projected image falls on a plane 600 defined by coordinates (x, y, 0). PP defines a projection point at coordinates (0,0,d), where d is a distance from the image plane 600 to the projection point PP. NPL defines a normal projection line to the plane 600. FIGS. 6B and 6C are side and top views are the coordinate system shown in FIG. 6A where db is the difference between a horizontal projection axis and the normal projection line NPL. $\Phi_{VT}$ and $\Phi_{VB}$ are the vertical top and bottom angles, respectively. $\Phi_{VL}$ and $\Phi_{VR}$ are the left and right angles, respectively. Hn0 is the vertical height and Wn0 is the horizontal width of the image in a nominal position.

Figure 7:
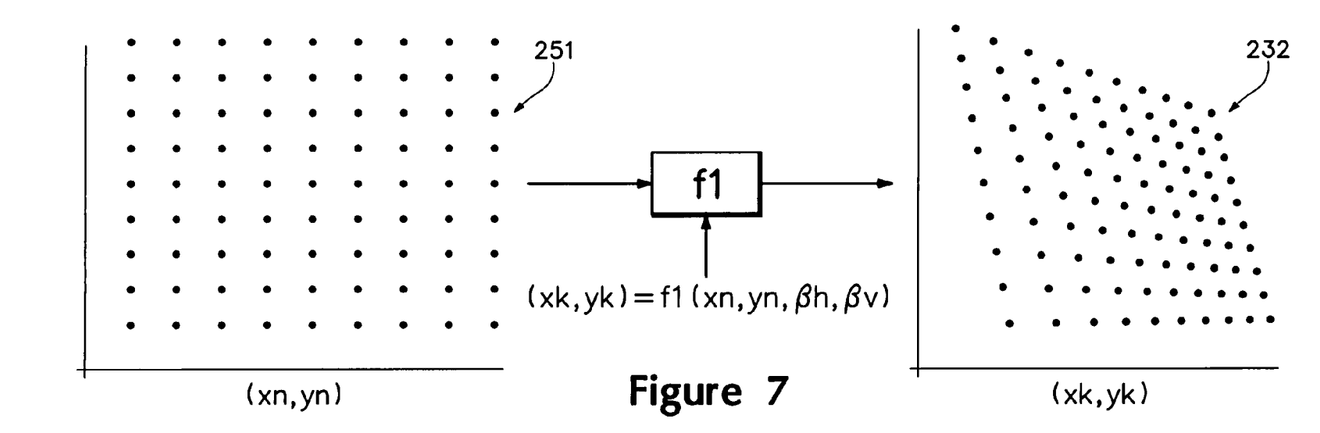
FIGS. 7 and 8 are graphical representations of the operation of the keystone controller shown in FIGS. 3 and 4.
Figure 8:
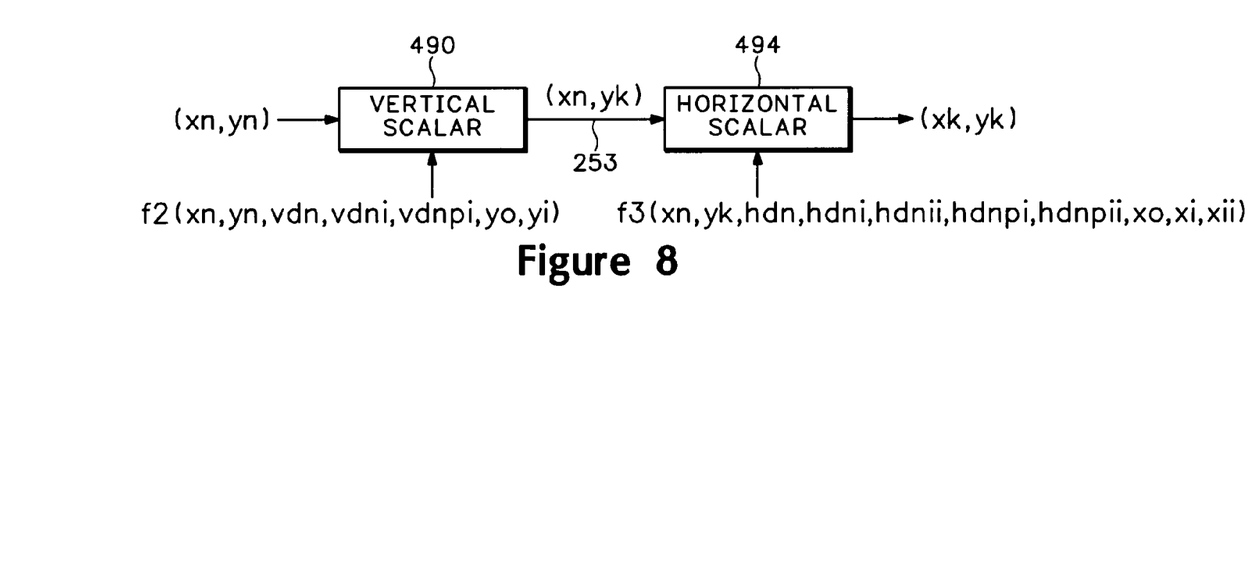

FIGS. 7 and 8 are graphical representations of the operation of the keystone controller 356. Referring to FIG. 7, the image data 355 (or 251) is represented by ($x_n$, $y_n$). The output data 232 is represented by ($x_k$, $y_k$). Formula 1 gives the function $f_1$.

$$(x_k, y_k) = f_1(x_n, y_n, \beta_h, \text{ and } \beta_v) \quad \text{Formula 1}$$

where $\beta_h$ is the horizontal rotation angle and $\beta_v$ is the vertical rotation angle of the desired keystone corrected (or distorted) image 232.

The keystone controller 356 calculates $f_1$ as follows.

$$xp[x, y] = \frac{\cos[\beta h] \times x - \sin[\beta h] \times \sin[\beta v] \times y}{1 + \frac{\sin[\beta h] \times x + \cos[\beta h] \times \sin[\beta v] \times y}{d}}$$

$$yp[x, y] = \frac{\cos[\beta v] \times y - \left(db - \frac{Hn0}{2}\right)}{1 + \frac{\sin[\beta h] \times x + \cos[\beta h] \times \sin[\beta v] \times y}{d}} + \left(db - \frac{Hn0}{2}\right)$$

To calculate the registers used to distort the image, the controller 256 fixes the center of the image with the user's selected center and uses the user's corner selection as follows. The corners associated with the keystone distorted image and corners associated with the nominal image are related by a function $f_5$.

$$(x_{kc}, y_{kc}) = f_5(x_{nc}, y_{nc}, \beta_h, \beta_v)$$

Where the function $f_5$ is given by the following formulas.

TopLeft $$xtl = \frac{-sh \times sv - ch \times Wn0}{1 + \frac{ch \times sv - sh \times Wn0}{d}}, \quad ytl = db - \frac{Hn0}{2} + \frac{cv - db + \frac{Hn0}{2}}{1 + \frac{ch \times sv - sh \times Wn0}{d}}$$

TopRight $$xtr = \frac{-sh \times sv + ch \times Wn0}{1 + \frac{ch \times sv + sh \times Wn0}{d}}, \quad ytr = db - \frac{Hn0}{2} + \frac{cv - db + \frac{Hn0}{2}}{1 + \frac{ch \times sv + sh \times Wn0}{d}}$$

BottomLeft $$xbl = \frac{-sh \times sv - ch \times Wn0}{1 + \frac{-ch \times sv + sh \times Wn0}{d}},$$

$$ybl = db - \frac{Hn0}{2} + \frac{-cv - db + \frac{Hn0}{2}}{1 + \frac{-ch \times sv + sh \times Wn0}{d}}$$

BottomRight $$xbr = \frac{sh \times sv + ch \times Wn0}{1 + \frac{-ch \times sv + sh \times Wn0}{d}},$$

$$ybr = db - \frac{Hn0}{2} + \frac{-cv - db + \frac{Hn0}{2}}{1 + \frac{-ch \times sv + sh \times Wn0}{d}}$$

Where:
sh→Sin [βh]
ch→Cos [βh]
sv→Sin [βv]
cv→Cos [βv]

Given a set of corners associated with the keystone distorted image ($x_{kc}$, $y_{kc}$) and having fixed the center of the distorted image at the user's selected center, the sine function of the horizontal rotation angle $\beta_h$ is calculated using simple arithmetic operations. Likewise, given ($x_{kc}$, $y_{kc}$) and the cosine function of the horizontal rotation angle $\beta_h$, the sine function of the vertical rotation angle $\beta_v$ is calculated using simple arithmetic operations. Solving for $f_5$ results in the following.

$$\sin[\beta h] = \frac{d \times (-xbl \times xtl + xbr \times xtr)}{Wn0 \times (xbr - xtl) \times (xbl - xtr)}$$

$$\cos[\beta h] = \sqrt{1 - sh^2}$$

-continued $$\mathrm{Sin}[\beta v] = \frac{d \times (xbl \times xbr - xtl \times xtr)}{\frac{H \times (xbr - xtl) \times (xbl - xtr)}{ch}}$$

The keystone controller 356 calculates the required register values for predistorting or keystone correcting the image. In an embodiment, the keystone controller 356 accesses a precalculated look up table comprising all of the register values for several rotation stages. Doing so speeds up execution time by allowing register value precalculation instead of having to calculate the register values on the fly.

Figure 11:
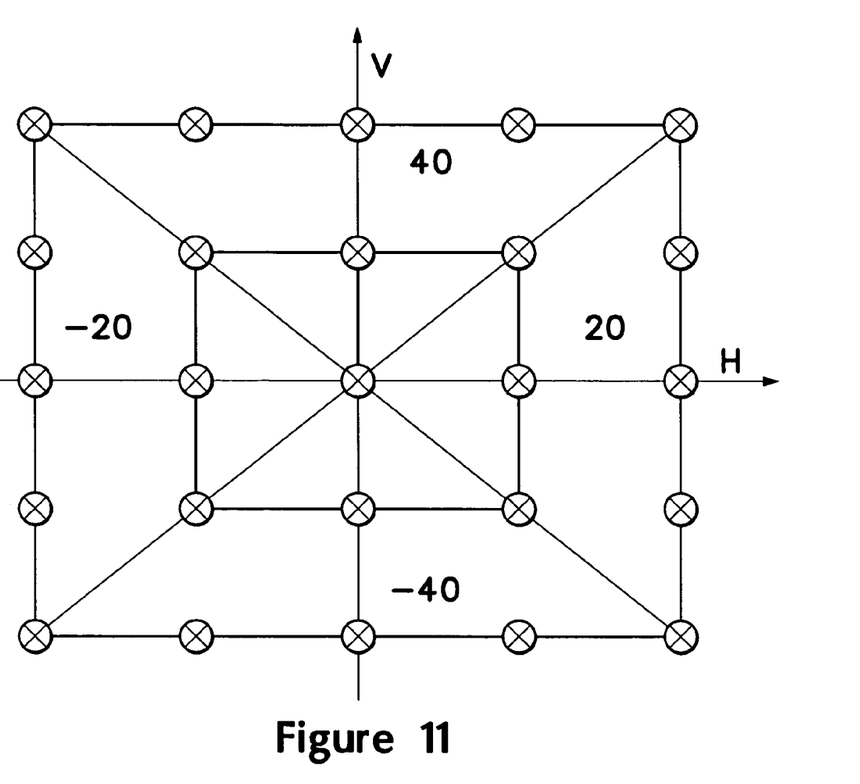
FIG. 11 is an embodiment of a lookup table.

FIG. 11 is an embodiment of a lookup table 1100. The table includes a predetermined number of combinations, e.g., 0, +/−10, and +/−20 on the x-axis and 0, +/−20, and +/−40 on the y-axis.

If a rotation angle combination falls between two points, the system interpolates between the values given by the table. The image rotation angles are sent from the driver 354 to the keystone controller 356 to initiate calculation of the scalar register values. The following is an exemplary bilinear interpolation formula.

$$wx = \frac{\beta h - \beta h[p]}{\beta h[p+1] - \beta h[p]}$$

$$wy = \frac{\beta v - \beta v[p]}{\beta v[q+1] - \beta v[q]}$$

$$\text{estimate} = (1-wx) \times (1-wy) \times \text{Table}[p, q] + wx \times (1-wy) \times \text{Table}[p+1, q] + (1-wx) \times wy \times \text{Table}[p, q+1] + wx \times wy \times \text{Table}[p+1, q+1]$$

Where the table provides the coordinates (p, q) of the nearest point and the keystone controller 356 interpolates the nearest point to the vertical and horizontal rotation angles of the interpolated point.

A person of reasonable skill in the art should identify several different interpolation methodologies as coming within the scope of the present invention. A person of reasonable skill in the art should realize the table could be implemented in a variety of manners using a variety of hardware, including implementing it as part of semiconductor memory 240 and/or 242 or memory embedded within the controller 250.

Formula $f_1$ is a complicated formula containing trigonometric functions that are computation intensive. The present invention constructs simple polynomials $f_2$ and $f_3$ that approximate $f_1$. Referring to FIGS. 1-8, the image data 251 is vertically scaled by vertical scalar 490 responsive to an $f_2$ function to produce the vertically scaled data 253. Formula 2 gives the function $f_2$.

$f_2(x_n, y_n, vdn, vdni, vdnpi, yo, yi)$      Formula 2

The vertical scalar 490 operates responsive to the register VDN and the x and y position (line and column number) of the projected image 518.

The vertical scalar 490 uses a vertical scale factor of VDN(x,y)=VDN+f(x,y).

The vertical offset registers YE and YO control the top edge of the image. The top of the image is a function of YE/YO and X. The top of the image is also a weak function of the registers VDN, VDNI, and VDNPI.

The vertical offset register 486 is related to YE (or YO)+f(x).

The vertical scalar 490 operates under the control of the microprocessor 488.

The vertically scaled data 253 is horizontally scaled by the horizontal scalar 494 responsive to an $f_3$ function to produce the horizontally scaled data 232. Formula 3 gives the function $f_3$.

$f_3(x_n, y_k, hdn, hdni, hdnii, hdnpi, hdnpii, xo, xi, xii)$      Formula 3

The horizontal scalar 494 operates responsive to the register HDN and the x and y position (line and column numbers) of the projected image 518.

The horizontal scalar 494 uses a horizontal scale factor of HDN(x,y)=HDN+f(x,y).

The horizontal offset register 486 directly controls the left edge of the image.

The horizontal scalar 494 operates under the control of the microprocessor 488.

Calculate $f_2$ and $f_3$ as follows.

$$f2 = eqnV = \sum_{j=0}^{b} \left( \frac{VDN}{2^{16}} + a \times \frac{VDNPI}{2^{16}} + j \times \frac{VDNI}{2^{16}} \right) + \left( YO + a \times \frac{YI}{2^{16}} \right)j$$

$$f3 = eqnH = \sum_{i=0}^{a} \left( \frac{HDN}{2^{16}} + \frac{HDNPII}{2 \times 2^{26}} \times i^2 + \left( \frac{HDNPI}{2^{16}} + \frac{HDNPII}{2 \times 2^{26}} \right) \times i + \frac{HDNII}{2 \times 2^{26}} \times b^2 + \left( \frac{HDNI}{2^{16}} + \frac{HDNII}{2 \times 2^{26}} \right) \times b \right) + \left( XO + b \times \frac{XI}{2^{16}} + b^2 \times \frac{XII}{2^{19}} \right)$$

The combination of $f_2$ and $f_3$ approximates $f_1$.

The vertical scalar 490 calculates its registers as follows.

With $f_1$ and a set of $(x_n, y_n)$, calculate $(x_k, y_k)$.

Given the $(x_n, y_n)$ input, the $(x_n, y_k)$ output, and $f_2$, the keystone controller 356 calculates vdn, vdni, vdnpi, yo, and yi.

The horizontal scalar 494 calculates its registers as follows.

Given the $(x_k, y_k)$ output, the $(x_n, y_k)$ input, and $f_3$, the keystone controller 356 calculates hdn, hdni, hdnii, xo, xi, and xii.

Figure 9:
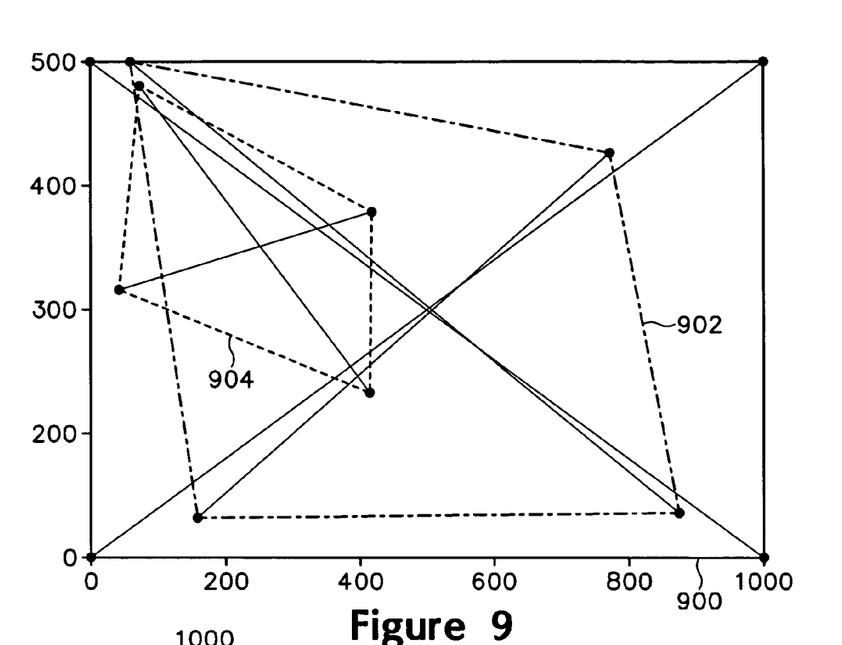
FIGS. 9 and 10 are graphical representations of comparisons between the inventive semiautomatic keystone correction system and method and more traditional keystone correction systems and methods.
Figure 10:
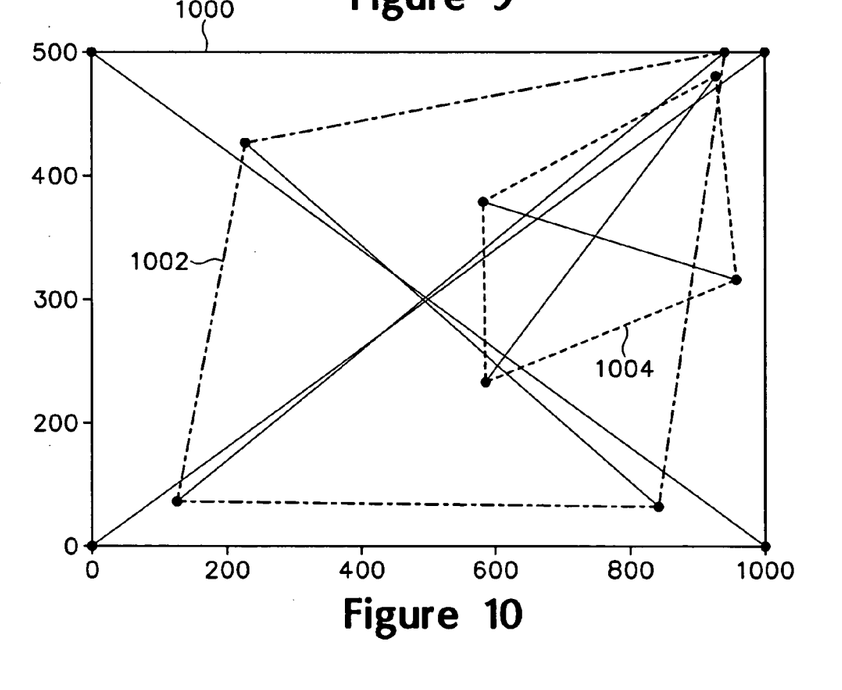

FIGS. 9 and 10 are graphical representations of comparisons between the inventive semiautomatic keystone correction system and method and more traditional keystone correction systems and methods. Referring to FIG. 9, image 900 represents the nominal image with no keystone correction. Image 902 is predistorted using center fix, first vertical/last horizontal (FVLH) inventive keystone correction system and method. And image 904 is predistorted using traditional keystone correction (e.g., minimal distortion method). The images 902 and 904 are keystone corrected 45 degrees horizontally and 20 degrees vertically. As shown, the image 904 moves around the plane because the minimal distortion method seeks to position the predistorted image in the area of the original image where there is least or minimal distortion. Doing so, however, results in a much smaller image relative to the image 902 corrected using the inventive keystone corrective system and method. In contrast, the image 904 remains fixed and aligned to the center of the image 900.

Referring to FIG. 10, image 1000 represents the nominal image with no keystone correction. Image 1002 is predistorted using center fix, first vertical/last horizontal (FVLH) inventive keystone correction system and method. And image 1004 is predistorted using traditional keystone correction. The images 1002 and 1004 are keystone corrected −45 degrees horizontally and 20 degrees vertically. As shown, the image 1004 is much smaller relative to the image 1002 corrected using the inventive keystone corrective system and method. And the image 1004 moves around the plane where the image 1002 remains fixed and aligned to the center of the image 1000.

Having illustrated and described the principles of our invention(s), it should be readily apparent to those skilled in the art that the invention(s) can be modified in arrangement and detail without departing from such principles. We claim all modifications coming within the spirit and scope of the accompanying claims.

We claim:

1. A method, comprising:
    selecting a plurality of corners within an original image projected as a distorted image on a projection surface using an input from a user through a graphical user interface; and
    predistorting the original image to account for any keystone distortion responsive to the selecting, where the predistorted image exhibits no keystone distortion when projected on the projection surface and the predistorting comprises vertically scaling and horizontally scaling the original image using a vertical scalar and a horizontal scalar according to the plurality of corners, respectively.

2. The method of claim 1 comprising:
    aligning a center of the original projected image with a center of the projection surface.

3. The method of claim 2 where the distorting is responsive to the aligning.

4. The method of claim 2 where the aligning is before the selecting.

5. The method of claim 2 comprising fixing a center of the predistorted image coincident with the center of the projection surface.

6. The method of claim 1 where the selecting comprises selecting two corners of the image.

7. The method of claim 1 where the selecting comprises selecting four corners of the image.

8. The method of claim 1 comprising:
    graphically aligning a center of the image with a center of the projection surface using the graphical user interface;
    vertically scaling the original image responsive to the graphically selecting and aligning by calculating vertical scalar registers;
    horizontally scaling the original image responsive to the graphically selecting and aligning by calculating horizontal scalar registers.

9. The method of claim 1, where the original image projected as a distorted image on a projection surface appears wider at the top than at the bottom.

10. The method of claim 1, where predistorting the original image is a function of a horizontal rotation angle and a vertical rotation angle of the desired keystone corrected image.

11. The method of claim 10, further comprising obtaining a sine function or a cosine function of the horizontal rotation angle.

12. The method of claim 11, further comprising obtaining the sine function or the cosine function of the horizontal rotation angle using a precalculated look up table.

13. The method of claim 1, further comprising horizontally scaling subsequent to vertically scaling the original image.

14. A method, comprising:
    selecting a plurality of corners within an original image projected as a distorted image on a projection surface using a graphical user interface; and
    predistorting the original image responsive to the selecting, where the predistorted image exhibits no distortion when projected on the projection surface;
    where the selecting comprises using an on screen display means to do the selecting; and
    where the predistorting the image comprises vertically scaling and horizontally scaling the original image using a vertical scalar and a horizontal scalar according to the plurality of corners, respectively.

15. A method, comprising:
    selecting a plurality of corners within an original image projected as a distorted image on a projection surface using a graphical user interface; and
    predistorting the original image responsive to the selecting, where the predistorted image exhibits no distortion when projected on the projection surface;
    where the predistorting the image comprises scaling the image;
    where the scaling comprises vertically scaling the image according to the plurality of corners; and
    where the vertically scaling comprises calculating vertical scalar registers.

16. The method of claim 15 where the scaling comprises horizontally scaling the image.

17. The method of claim 16 where the horizontally scaling comprises calculating horizontal scalar registers.

18. An apparatus, comprising:
    means for graphically selecting a plurality of corners within an original image projected as a distorted image on a projection surface using an input from a user through a graphical user interface; and
    means for predistorting the original image to account for any keystone distortion responsive to the selecting, without a means for mechanically changing an angle of an image plate in the apparatus, where the predistorted image exhibits no keystone distortion when projected on the projection surface;
    means for vertically scaling and horizontally scaling the original image according to the plurality of corners.

19. The apparatus of claim 18 comprising:
    means for aligning a center of the image with a center of the projection surface.

20. The apparatus of claim 19 where the means for distorting is responsive to the center of the image.

21. The apparatus of claim 19 where the means for distorting fixes the center of the distorted image with the center of the projection surface.

22. The apparatus of claim 18 where the means for selecting is capable of selecting two corners of the image.

23. The apparatus of claim 18 where the means for selecting is capable of selecting four corners of the image.

24. The apparatus of claim 18 where the original image projected distorted on a projection surface appears wider at the top than at the bottom.

25. An apparatus, comprising:
   means for selecting a plurality of corners within an original image projected as a distorted image on a projection surface using a graphical user interface; and
   means for predistorting the original image responsive to the selecting, where the predistorted image exhibits no distortion when projected on the projection surface;
   where the means for selecting comprises a means for using an on screen display means to do the selecting; and
   where the means for predistorting the original image comprises vertically scaling and horizontally scaling the original image using a vertical scalar and a horizontal scalar according to the plurality of corners, respectively.

26. An apparatus, comprising:
   means for selecting a plurality of corners within an original image projected as a distorted image on a projection surface using an input from a user through a graphical user interface; and
   means for predistorting the original image to account for any keystone distortion responsive to the selecting, where the predistorted image exhibits no keystone distortion when projected on the projection surface;
   where the means for predistorting the image comprises means for scaling the image;
   where the means for scaling comprises means for vertically scaling the image according to the plurality of corners; and
   where the means for vertically scaling comprises means for calculating vertical scalar registers.

27. The method of claim 26 where the means for scaling comprises means for horizontally scaling the image.

28. The apparatus of claim 27 where the means for horizontally scaling comprises means for calculating horizontal scalar registers.

29. An apparatus, comprising:
   a user interface to allow a user to graphically select a plurality of corners of an original image projected as a distorted image on a projection surface using an input from a user through a graphical user interface;
   a controller to predistort the original image to account for any keystone distortion responsive to the selection, where the predistorted image exhibits no keystone distortion when projected on the projection surface;
   where the controller includes a vertical scalar and a horizontal scalar to scale the original image vertically and horizontally according to the plurality of corners, respectively.

30. The apparatus of claim 29 where the interface aligns the image with a center of the surface.

31. The apparatus of claim 29 where the interface is a graphical user interface.

32. The apparatus of claim 29 where the plurality of corners is two.

33. The apparatus of claim 29 where the plurality of corners is four.

34. The apparatus of claim 29 where the controller generates a distorted image before projecting the distorted image on the surface.

35. An apparatus, comprising:
   a user interface to allow a user to graphically select a plurality of corners of an original image projected as a distorted image on a projection surface using an input from a user through a graphical user interface;
   a controller to predistort the original image to account for any keystone distortion responsive to the selection, where the predistorted image exhibits no keystone distortion when projected on the projection surface;
   where the controller comprises:
      a vertical scalar to vertically scale the image according to the plurality of corners; and
      a horizontal scalar to horizontally scale the image according to the plurality of corners.

36. The apparatus of claim 35 where the controller sets scalar registers.

37. The apparatus of claim 36 where the vertical and horizontal scalars operate responsive to the scalar registers.

* * * * *